United States Patent
Maerz et al.

(10) Patent No.: US 11,242,936 B2
(45) Date of Patent: Feb. 8, 2022

(54) MAGNETIC SEAT ENGAGEMENT IN A BALL CHECK VALVE

(71) Applicant: Tier 1 Energy Tech, Inc., Edmonton (CA)

(72) Inventors: Stephen Maerz, Calgary (CA); Stephen Vetter, Sylvan Lake (CA); Clinton Buttnor, Edmonton (CA)

(73) Assignee: Tier 1 Energy Tech, Inc., Edmonton (CA)

( * ) Notice: Subject to any disclaimer, the term of this patent is extended or adjusted under 35 U.S.C. 154(b) by 0 days.

(21) Appl. No.: 17/203,424

(22) Filed: Mar. 16, 2021

(65) Prior Publication Data

US 2021/0285557 A1    Sep. 16, 2021

Related U.S. Application Data

(60) Provisional application No. 62/990,043, filed on Mar. 16, 2020.

(51) Int. Cl.
*F16K 15/04* (2006.01)
*F16K 31/08* (2006.01)

(52) U.S. Cl.
CPC ............ *F16K 15/048* (2013.01); *F16K 31/08* (2013.01); *F16K 31/082* (2013.01); *F16K 31/084* (2013.01)

(58) Field of Classification Search
CPC ...... F16K 31/084; F16K 31/082; F16K 31/08; F16K 15/048
See application file for complete search history.

(56) References Cited

U.S. PATENT DOCUMENTS

| | | | | |
|---|---|---|---|---|
| 3,026,903 A | * | 3/1962 | Roach | F16K 31/08 137/533.13 |
| 3,202,174 A | * | 8/1965 | Rudelick | F16K 31/22 137/432 |
| 3,491,790 A | * | 1/1970 | Sanford | F16K 15/04 137/533.11 |
| 3,850,189 A | * | 11/1974 | Follett | F16K 17/285 137/39 |
| 3,891,000 A | * | 6/1975 | Melnick | F16K 31/08 137/855 |
| 3,905,391 A | * | 9/1975 | Oakes | F16K 15/144 137/855 |
| 4,212,313 A | * | 7/1980 | Winters | F16K 17/366 137/39 |
| 4,349,042 A | * | 9/1982 | Shimizu | F16K 31/084 137/39 |
| 4,465,095 A | * | 8/1984 | Lindberg | F02M 25/0225 137/614.2 |
| 4,764,046 A | * | 8/1988 | Kitamura | A45D 34/042 137/43 |
| 6,164,322 A | * | 12/2000 | Najmolhoda | F15B 13/024 137/539 |

(Continued)

*Primary Examiner* — Craig M Schneider
*Assistant Examiner* — Frederick D Soski
(74) *Attorney, Agent, or Firm* — Bennett Jones LLP

(57) ABSTRACT

A check valve comprising a body, a ball movable within a ball area of the body, a seat for receiving the ball, and a magnet for exerting a magnetic force on the ball is provided. The ball and seat are changeable between a closed state and an open state, the closed state having the ball in sealing engagement with the step, and the open state having a portion of the step separated from the ball with a space therebetween.

11 Claims, 5 Drawing Sheets

(56) References Cited

U.S. PATENT DOCUMENTS

| | | | | |
|---|---|---|---|---|
| 7,615,151 | B2* | 11/2009 | Wieczorek | F02M 37/48 |
| | | | | 210/235 |
| 7,992,233 | B1* | 8/2011 | Goettl | F16K 24/06 |
| | | | | 4/504 |
| 8,104,591 | B2* | 1/2012 | Barefoot | F16F 9/461 |
| | | | | 188/267.2 |
| 9,322,449 | B2* | 4/2016 | Barefoot | F16F 9/34 |
| 9,745,824 | B2* | 8/2017 | Veit | E21B 43/26 |
| 9,989,181 | B2* | 6/2018 | Liu | B33Y 30/00 |
| 10,954,658 | B2* | 3/2021 | Ross-Kent | E03D 1/14 |
| 2005/0139801 | A1* | 6/2005 | Ott | F16K 31/084 |
| | | | | 251/359 |
| 2010/0139787 | A1* | 6/2010 | Li | F16K 17/285 |
| | | | | 137/519.5 |
| 2011/0232779 | A1* | 9/2011 | Oh | F16K 17/20 |
| | | | | 137/485 |
| 2011/0255996 | A1* | 10/2011 | Wickstead | F16K 15/04 |
| | | | | 417/53 |
| 2013/0221255 | A1* | 8/2013 | Ferguson | F16K 31/0651 |
| | | | | 251/129.15 |

\* cited by examiner

MAGNETIC SEAT ENGAGEMENT IN A BALL CHECK VALVE

TECHNICAL FIELD

The present invention relates generally to valves and, in particular, ball check valves.

BACKGROUND

Ball-type valves are used in a number of industries, such as the oil and gas industry, to control the flow of fluids. Ball-type valves generally include a ball and a seat. Ball-type valves may have two states: open and closed. When the ball is received in the seat, a seal is formed, preventing fluid communication from one end of the valve to the other, meaning the valve is in the closed state. When the ball is not coupled to the seat, fluid may flow through the valve, meaning the valve is in the open state.

Check valves (also known as one-way valves) are used to prevent reverse flow. For example, in one application in the oil and gas industry, check valves may be used to capture fluid carried into production tubing and prevent the fluid from dropping out of the tubing when the well flow is stopped. When the flow is resumed, captured fluid is carried to surface by reservoir pressure or when combined with some form of artificial lift (e.g., rod pump, plunger-lift, gas-lift, etc.).

Various factors can affect the functioning of ball-type check valves, including, without limitation, down-hole conditions, pressure on either side of the check valve, fluid passing through the check valve, and gravity. A ball valve may be biased into an open or closed state by means of a spring or by gravity.

SUMMARY OF INVENTION

In one aspect, the invention may comprise a check valve comprising a body including a first end, a second end, and an inner wall; a ball, made of a magnetic material, having a ball diameter, movable within a ball area of the body proximate the first end; a valve seat for receiving the ball at a step of the seat, the seat being an annular member connected to the inner surface between the ball area and the second end, having an inner seat diameter lesser than the ball diameter; a magnet between the step and the second end for exerting a magnetic force on the ball in a direction from the first end to the second end; and the ball and seat being changeable between a closed state and an open state, the closed state having the ball in sealing engagement with the step, and the open state having a portion of the step a distance from the ball.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

As used herein, a "magnetic material" is a material which can be magnetized or which are strongly attracted to a magnet. A permanent magnet is a material which has its own persistent magnetic field. Ferromagnetic materials are well known and include transition metals such as iron, nickel, cobalt and their alloys, and alloys of rare earth metals. A "non-magnetic material" is thus a material that cannot be magnetized or which is not attracted, or only very weakly attracted to a magnet.

The magnets used herein are preferably permanent magnets.

A check valve is provided with a ball-seat engagement for changing the check valve between open and closed states. The ball-seat engagement includes a magnet to magnetically attract the ball toward the check valve. This is particularly useful when the check valve is arranged horizontally such that gravity biases the ball out of engagement with the seat.

Figure 1:
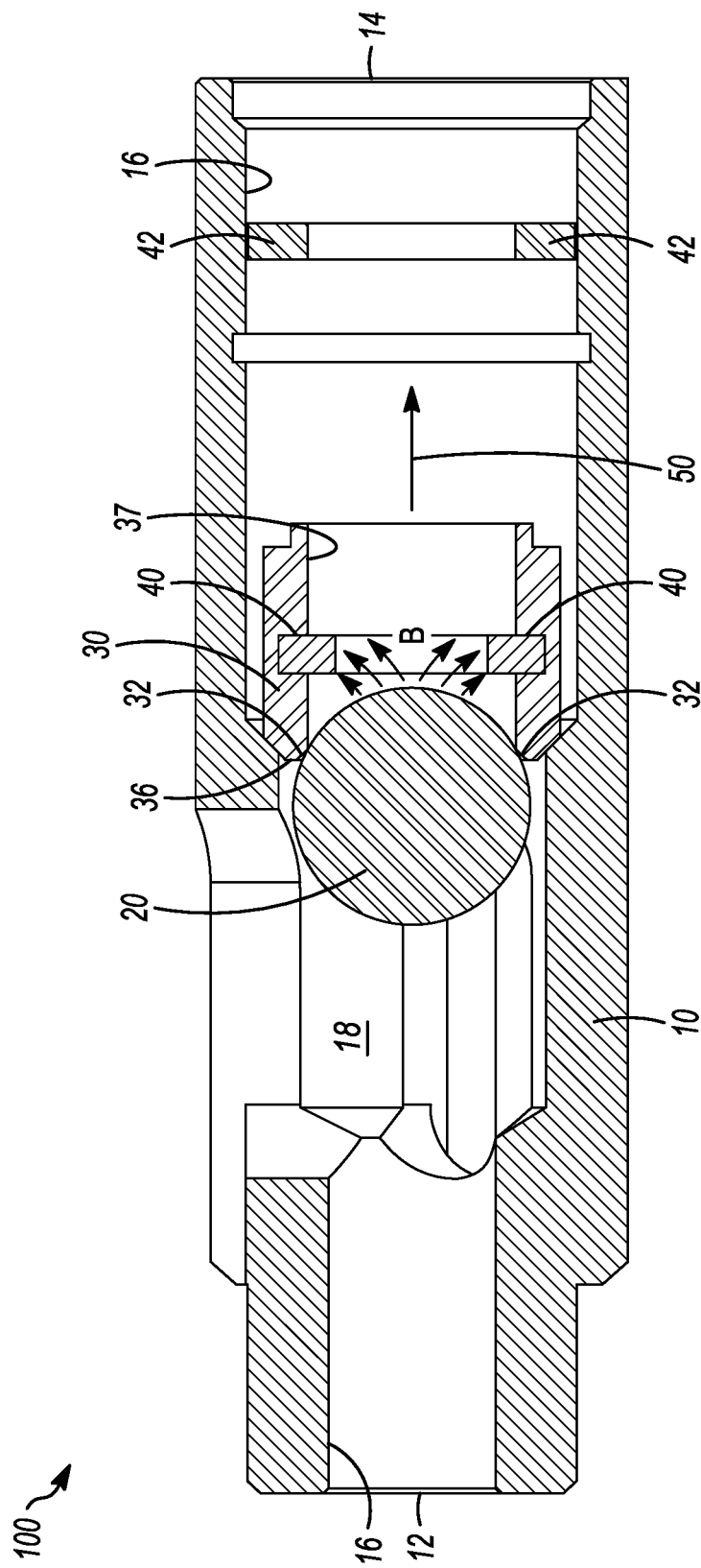
FIG. 1 is a cross sectional view of a check valve in a closed state;
(b)

With reference to FIG. 1, in one embodiment, check valve 100 has a body 10. Body 10 may be an elongate annular member, such as a pipe, with a first end 12, a second end 14, and an inner wall 16.

A ball 20 is located in a ball area 18 of body 10. Ball area 18, located between first end 12 and a seat 30, is a space within which ball 20 may move with relative freedom, depending on factors including whether the check valve is in a closed state or an open state. Ball 20 may be made of a magnetic material such as steel or iron.

The seat 30 may receive ball 20 and thereby form a sealing engagement. The seat 30 is provided between the ball area 18 and the second end 14. Seat 30 may be an annular member. Seat 30 may be elongate. Seat 30 may be connected to inner wall 16. Seat 30 may be coaxial with body 10. Seat 30 may have an inner seat diameter 34 that is lesser than a ball diameter 22.

Figure 2:
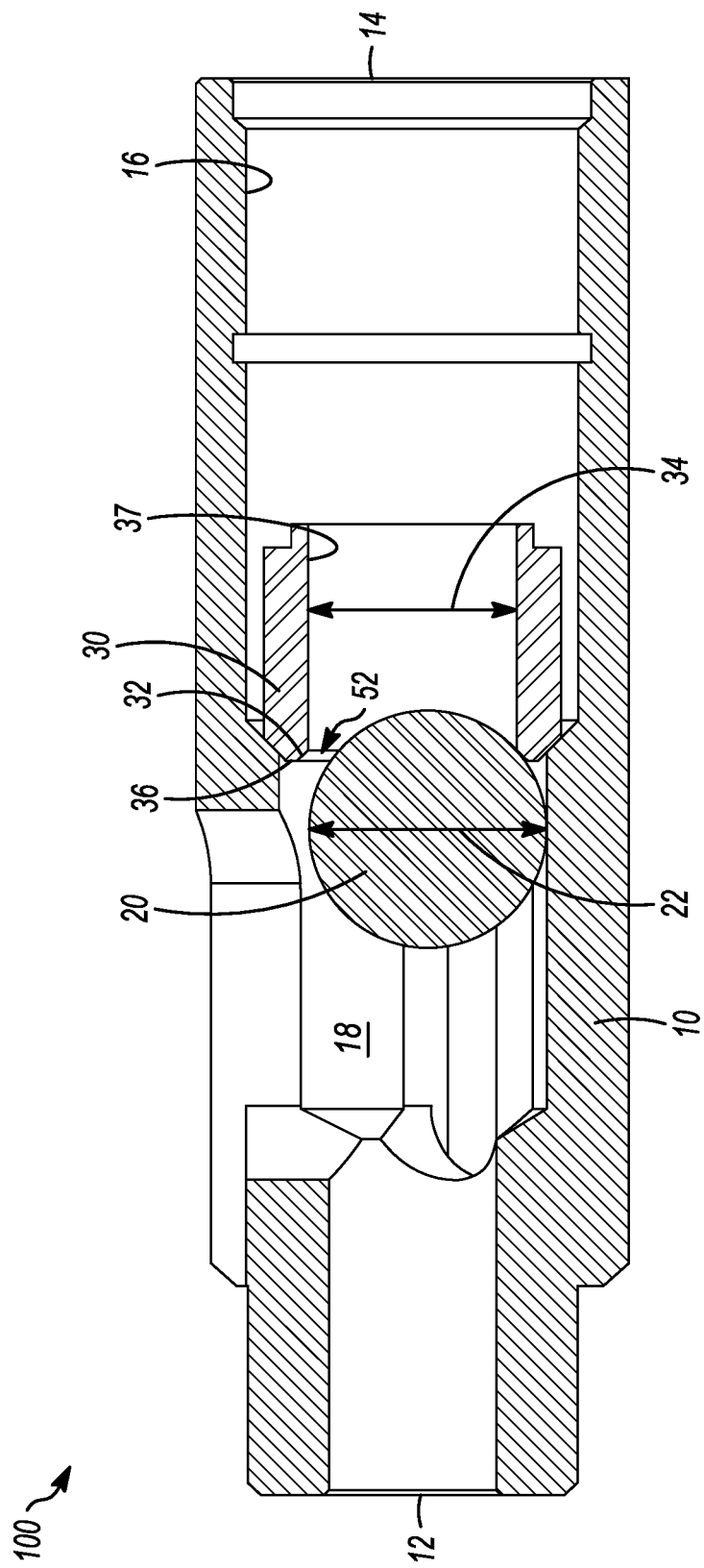
FIG. 2 is a cross sectional view of a check valve in an open state;
(c)

A step 32 is a portion of seat 30 where ball 20 comes into contact with seat 30. Step 32 is at or near the end of seat 30 closest to first end 12. The step may be square, such that the seat's rim 36 and an inner surface 37 of the seat meet at a substantially right angle when viewed cross-sectionally. The step may be rounded, such that rim 36 tapers into surface 37 to form a horn shape. The step may be sloped such that, viewed cross-sectionally, rim 36 and surface 37 are separated by an angled edge (as illustrated in FIGS. 1 and 2). A rounded and/or sloped step may facilitate engagement between the ball and the seat by encouraging the ball to roll into a sealing engagement with the step.

As illustrated in FIG. 1, in the closed state, the ball is in contact with substantially all of a circumference of the step, thereby forming a sealing engagement with the step. As illustrated in FIG. 2, in the open state, at least a portion of the step's circumference is not in contact with the ball, thereby allowing fluid communication from one side of the step to the other. In the open state, a portion of rim 36 is separated by a space 52 from the ball.

A magnet may be provided to exert a magnetic force on the ball to encourage engagement with the seat. The magnet may be one or more magnets, each of which may be positioned at various locations including those described herein. In one embodiment, magnets 40 are connected to inner surface 37 of seat 30. Magnets 40 exert a magnetic force illustrated in FIG. 1 by arrows B thereby causing ball 20 to move substantially in a direction 50 from first end 12 to second end 14. The magnet may be provided between the step and the second end 14. In one embodiment, magnets 42 are connected to inner wall 16 between seat 30 and second end 14.

A vertically oriented check valve ball, such as when installed in production tubing set in a vertical hole, may be lifted from the ball seat by upward flow of the well fluid. When the well flow stops, gravity pulls the ball downwards, which allows the ball to naturally center itself and making sealing contact with the seat circumference. However, when production tubing is placed in a lower section transitioning from vertical into a horizontal section (or the horizontal section itself), gravity cannot be relied upon to center and seat the ball.

It will be appreciated that the check valve may have any number of orientations. In one example, the check valve may be oriented vertically with the ball above the seat. In this case, gravity will exert downward force on the ball causing it to be biased into the seat. In another example, the check valve may be substantially or nearly horizontal. In such an orientation, gravity will tend to exert force on the ball causing it to be biased out of the seat or may be insufficient to move the ball into the seat. Assuming that a default closed check valve state is desired, it will be appreciated that a magnet may promote movement of the ball into engagement with the seat. It will also be appreciated that in such cases a rounded and/or sloped step will be particularly advantageous, as such shapes may act as a ramp to facilitate the ball's engagement with the seat.

Figure 4:
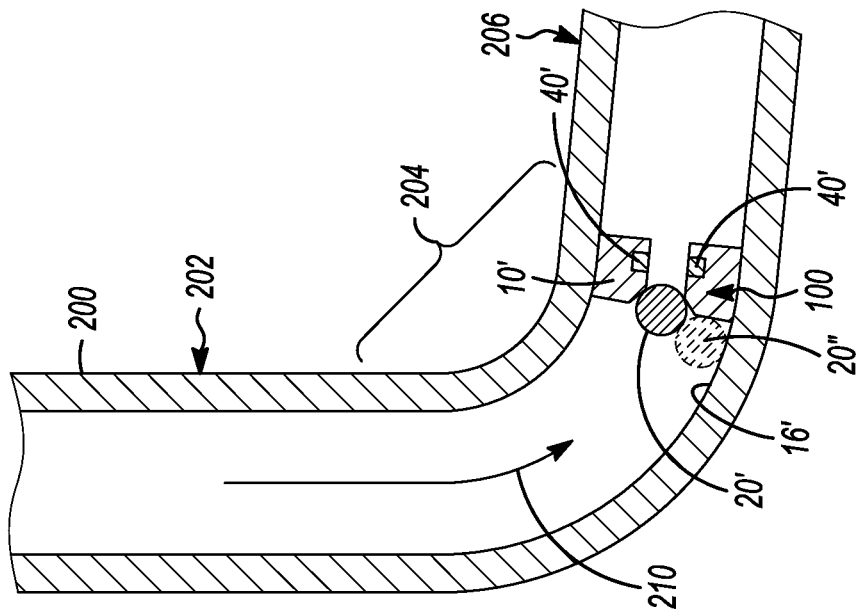
FIG. 4 is a diagram of a check valve in closed state installed at a heel of a deviated wellbore;
(e)
Figure 3:
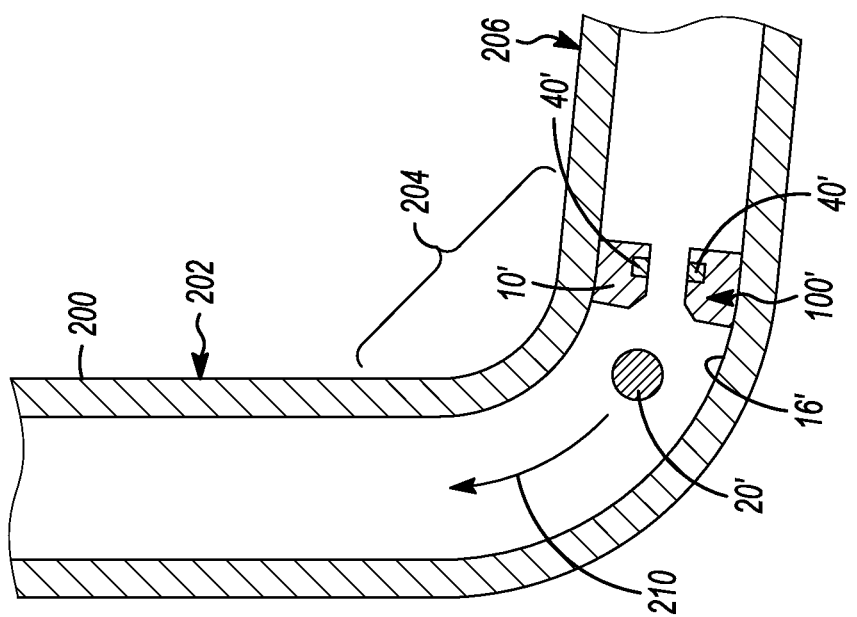
FIG. 3 is a diagram of a check valve in an open state installed at a heel of a deviated wellbore;
(d)

With reference to FIGS. 3 and 4, in one embodiment, check valve 100' is installed in a deviated wellbore 200. FIG. 3 illustrates conditions similar to when the well is flowing. FIG. 4 illustrates conditions similar to when flow halts and fluid drops back down into the wellbore. Wellbore 200 has vertical section 202, horizontal section 206, and heel section 204 therebetween. Check valve 100' is installed in a lower part of heel section 204 to support a gas-lift system to remove fluids from the wellbore to reduce hydrostatic pressure on a producing formation. In FIG. 3, fluid is moving in direction 210 generally from horizontal section 206 to vertical section 202. Such movement of fluid causes ball 20' to disengage from the seat 10' and thereby cause the check valve to be in an open state. In FIG. 4, fluid is moving in a direction 212 generally from vertical section 202 to horizontal section 206. Such movement may cooperate with gravity to cause the ball to rest near where the step meets the inner wall 16' as illustrated in phantom in FIG. 4 with ball 20". Magnets 40' exert a force on ball 20' sufficient to cause the ball to travel up into engagement with the seat.

Figure 6:
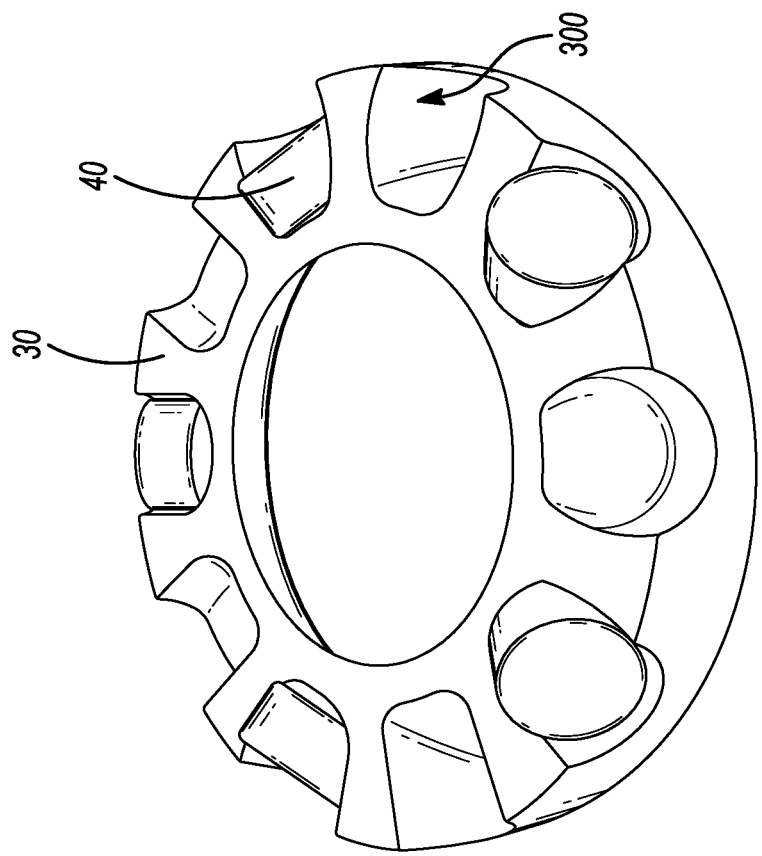
FIG. 6 shows the valve seat with magnet placement;
(g)
Figure 5:
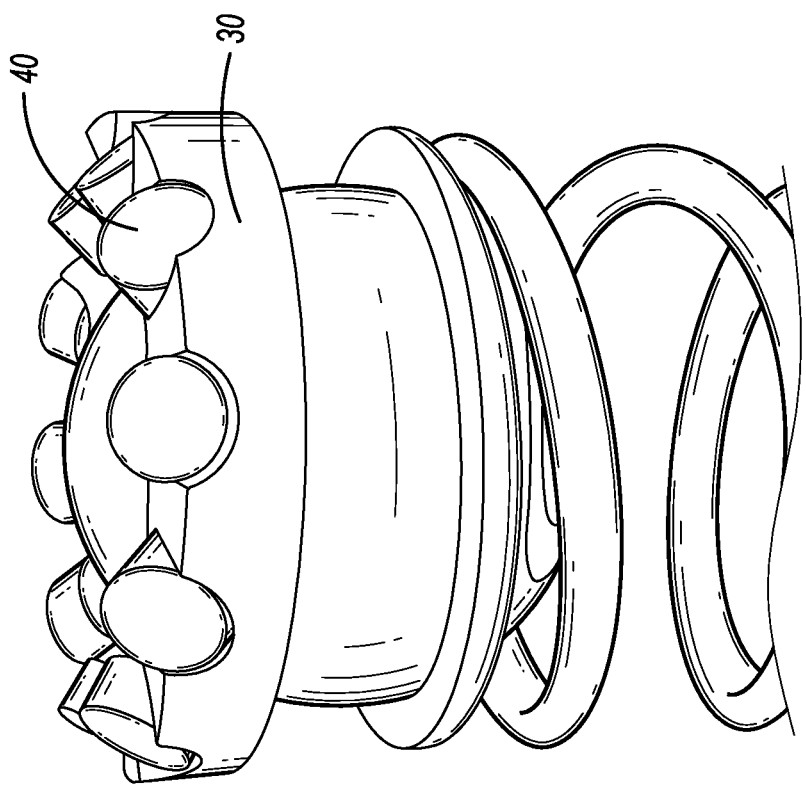
FIG. 5 shows a ball and valve seat, with a ring magnetic arrangement;
(f)
Figure 7:
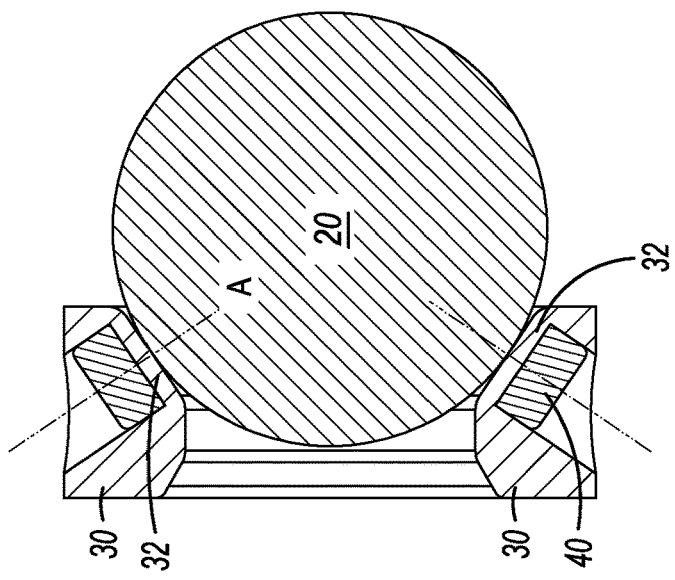
FIG. 7 shows a cross-sectional view of the ball and valve seat of FIG. 5, showing the magnetic axis of the magnets;
(h)

In some embodiments, the valve seat 30 may comprise a ring having a central opening, as shown in FIGS. 5-7. The seat 30 comprises a step 32 which is angled to be tangential to the ball when the ball is seated. The seat comprises a plurality of magnet slots 300, arrayed around the circumference of the ring opening. Individual magnets 40 may then be placed in the slots, and held in place by friction or by an adhesive. The magnets are thus positioned very close to the step 32 surface, while not impinging on the flow area of the valve opening.

The magnets may be any suitable geometric shape, such as disc, ring, cylindrical or prismatic magnets. The magnetic axis of the magnets may be in any orientation, so long as a sufficient magnetic field is provided in the direction of the ball, so as to attract the ball and cause the ball to engage the valve seat when the ball is sufficiently proximate to the valve seat.

In some embodiments, the magnet comprises a small disk magnet, which, in one embodiment, has its magnetic axis (A) run axially through the magnet, as shown by the lines in FIG. 7. Thus, in some embodiments, the magnets comprise a plurality of magnets each having a magnetic axis, and wherein all the magnetic axes converge onto the ball.

The number of magnets may be varied to provide sufficient magnetic force to adequately attract the ball, while not being too strong as to prevent opening of the ball valve when desired. The required or desired magnetic force is dependent on many factors, including the weight and magnetic characteristics of the ball, the strength of the magnet and the orientation of its magnetic axis or magnetic field, the orientation of the valve when installed, and other factors known to those skilled in the art. The number and/or strength of the individual magnets may be chosen accordingly. For example, the valve seat may define 10 magnet slots 300, and 2-10 magnets may be installed to provide sufficient magnetic force for a particular installation and magnet strength.

Figure 9:
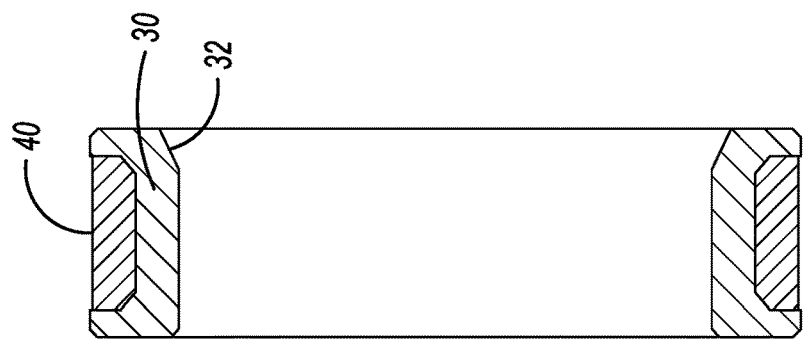
FIG. 9 shows a cross-sectional view of the valve seat of FIG. 8.
Figure 8:
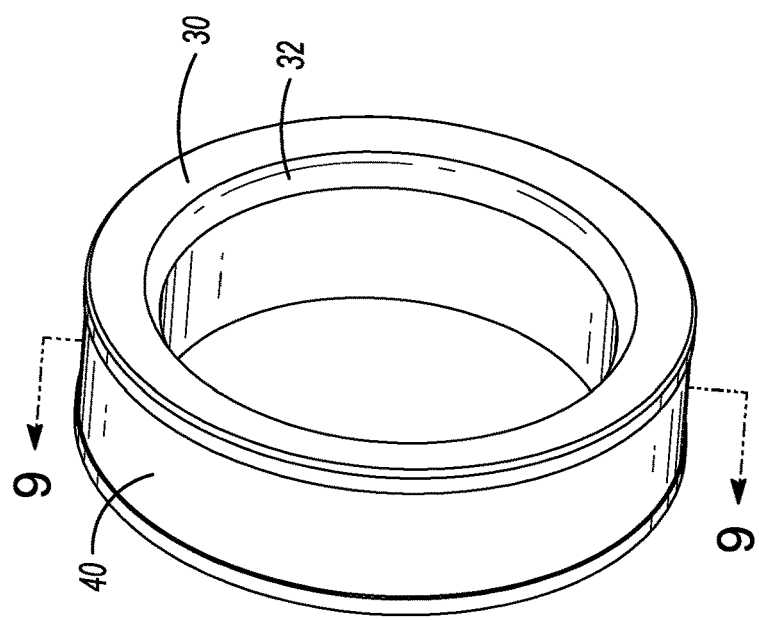
FIG. 8 shows an alternative embodiment of a valve seat having a ring magnet; and
(i)

In some embodiments, the magnet may comprise a ring magnet 40 which is embedded or sintered into the outer circumference of the circular seat 30, as shown in FIGS. 8 and 9. In some embodiments, the valve seat 30 itself may be a magnet or magnetized, obviating the need for separate discrete magnets.

In some embodiments, the ball 20 may be a magnet or magnetized and the valve seat 30 made from a magnetic material, however the valve body 10 would have to be made from a non-magnetic material to prevent the ball from sticking to other parts of the valve body 10.

Exemplary Aspects

In view of the described devices, systems, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1. A check valve comprising:
 a body, being an elongate annular member, including a first end, a second end, and an inner wall;

a ball, made of a magnetic material, having a ball diameter, movable within a ball area of the body proximate the first end;

a seat for receiving the ball at a step of the seat, the seat being an annular member connected to the inner surface between the ball area and the second end, having an inner seat diameter lesser than the ball diameter;

a magnet between the step and the second end for exerting a magnetic force on the ball substantially in a direction from the first end to the second end; and the ball and seat being changeable between a closed state and an open state, the closed state having the ball in sealing engagement with the step, and the open state having a portion of the step separated from the ball with a space therebetween.

Aspect 2. The check valve of any one or more of Aspects 1-8 wherein the magnet is connected to the seat.

Aspect 3. The check valve of any one or more of Aspects 1-8 wherein the magnet is connected to the inner wall between the seat and the second end.

Aspect 4. The check valve of any one or more of Aspects 1-8 wherein the step is sloped.

Aspect 5. The check valve of any one or more of Aspects 1-8 wherein the step is square.

Aspect 6. The check valve of any one or more of Aspects 1-8 wherein the step is rounded.

Aspect 7. The check valve of any one or more of Aspects 1-8 wherein the seat is coaxial with body.

Aspect 8. A check valve comprising a magnetic ball and a valve seat having a central opening, wherein the valve seat comprises a plurality of magnets or (b) a ring magnet disposed or arrayed around the central opening, within the valve seat.

Aspect 9. The check valve of Aspect 8 comprising a plurality of disc magnets each having a magnetic axis converging on the ball.

Aspect 10. The check valve of Aspect 9 wherein the valve seat is a circular ring and which defines a plurality of magnet slots arrayed around a periphery of the valve seat ring.

Aspect 11. The check valve of any one or more of Aspects 1-10 for installation at a lower part of a heel of a deviated wellbore to support a gas-lift system to remove fluids from the wellbore to reduce hydrostatic pressure on a producing formation.

Aspect 12. The check valve of any one of Aspect 1-11, comprising any feature or element described herein, or omitting any described feature or element, or comprising any combination of described features and elements.

Interpretation

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio

The invention claimed is:

1. A check valve comprising:
  a body, being an elongate annular member, including a first end, a second end, and an inner wall;
  a ball, made of a magnetic material, having a ball diameter, movable within a ball area of the body proximate the first end, the ball area having a central longitudinal axis;
  a seat for receiving the ball at a step of the seat, the seat being an annular member connected to the inner surface between the ball area and the second end, having an inner seat diameter lesser than the ball diameter;
  a plurality of magnets between the step and the second end for exerting a magnetic force on the ball substantially in a direction from the first end to the second end, wherein each magnet has a planar face at an acute angle to the central axis, each magnet having a magnetic axis which is perpendicular to the planar face, and wherein a portion of the seat is disposed between the magnet planar face and the ball area; and the ball and seat being changeable between a closed state and an open state, the closed state having the ball in sealing engagement with the step, and the open state having a portion of the step separated from the ball with a space therebetween.

2. The check valve of claim 1 wherein the magnets are connected to the seat.

3. The check valve of claim 1 wherein the magnets are connected to the inner wall between the seat and the second end.

4. The check valve of claim 1 wherein the step is sloped.

5. The check valve of claim 1 wherein the step is square.

6. The check valve of claim 1 wherein the step is rounded.

7. The check valve of claim 1 wherein the seat is coaxial with body.

8. The check valve of claim 1 wherein the plurality of magnets are embedded into the valve seat.

9. The check valve of claim 1 wherein the valve seat is a circular ring and which defines a plurality of magnet slots arrayed around a periphery of the valve seat ring, within which the magnets are inserted.

10. A method of biasing the check valve of claim 1 into a closed state.

11. The method of claim 10, wherein the plurality of magnets are embedded into the valve seat.

\* \* \* \* \*